May 24, 1927.
W. E. DUNNING ET AL
1,629,615
ADDING MACHINE
Filed May 22, 1922
4 Sheets-Sheet 2
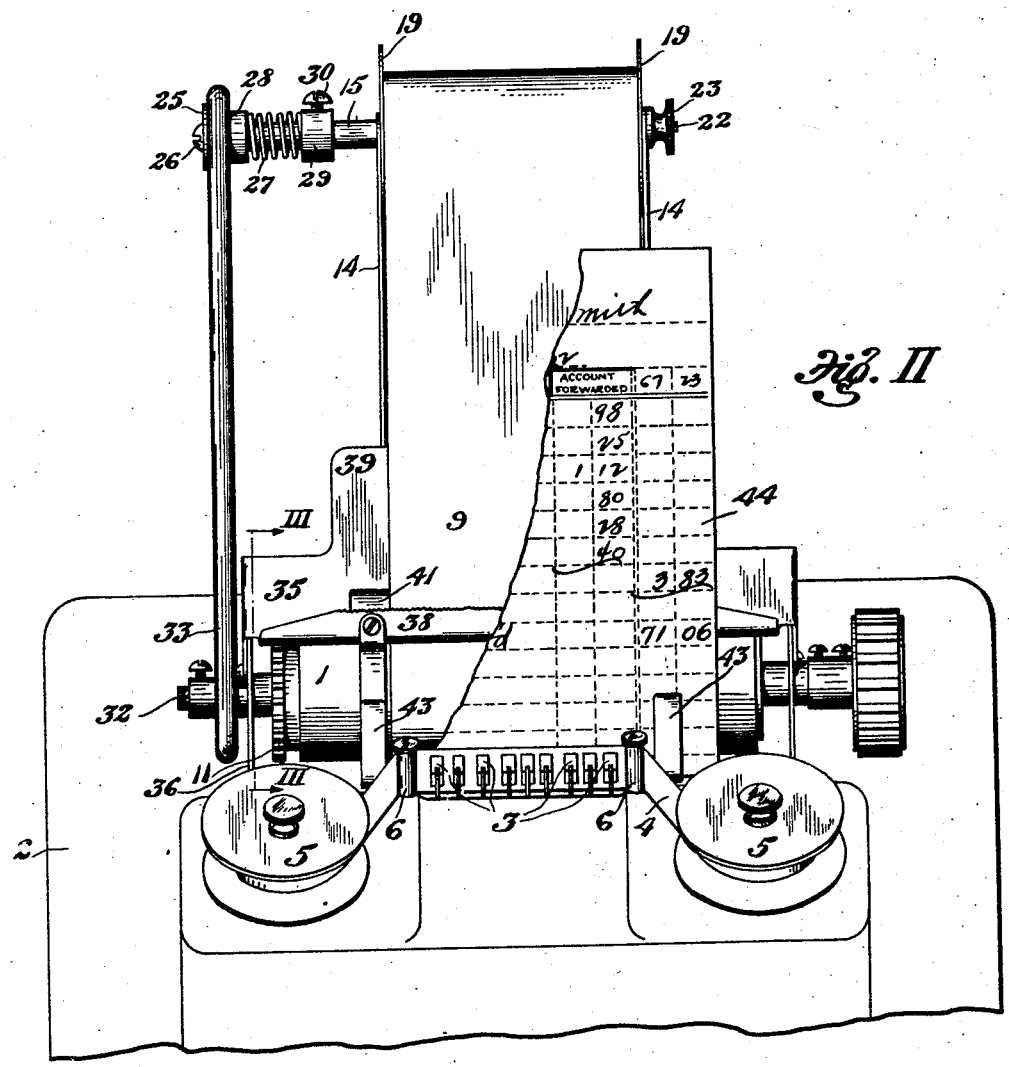
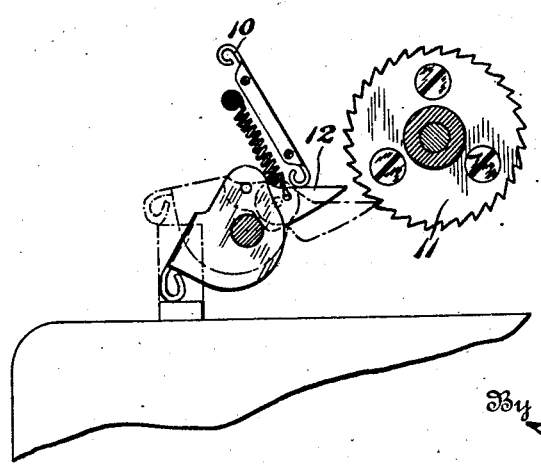
Inventors
William E. Dunning and
Jacob Bachofen
By Freash and Bond
Attorneys

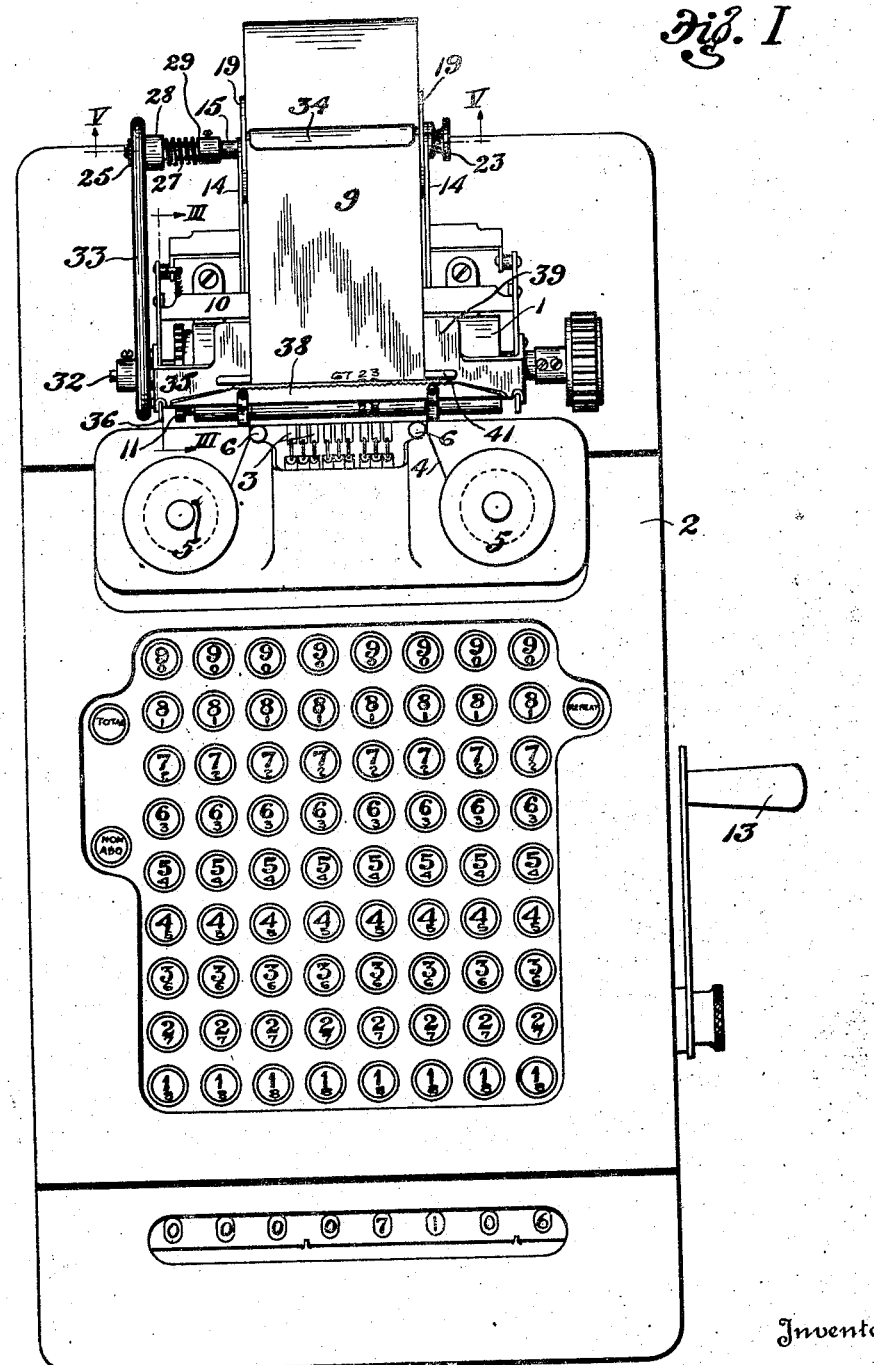

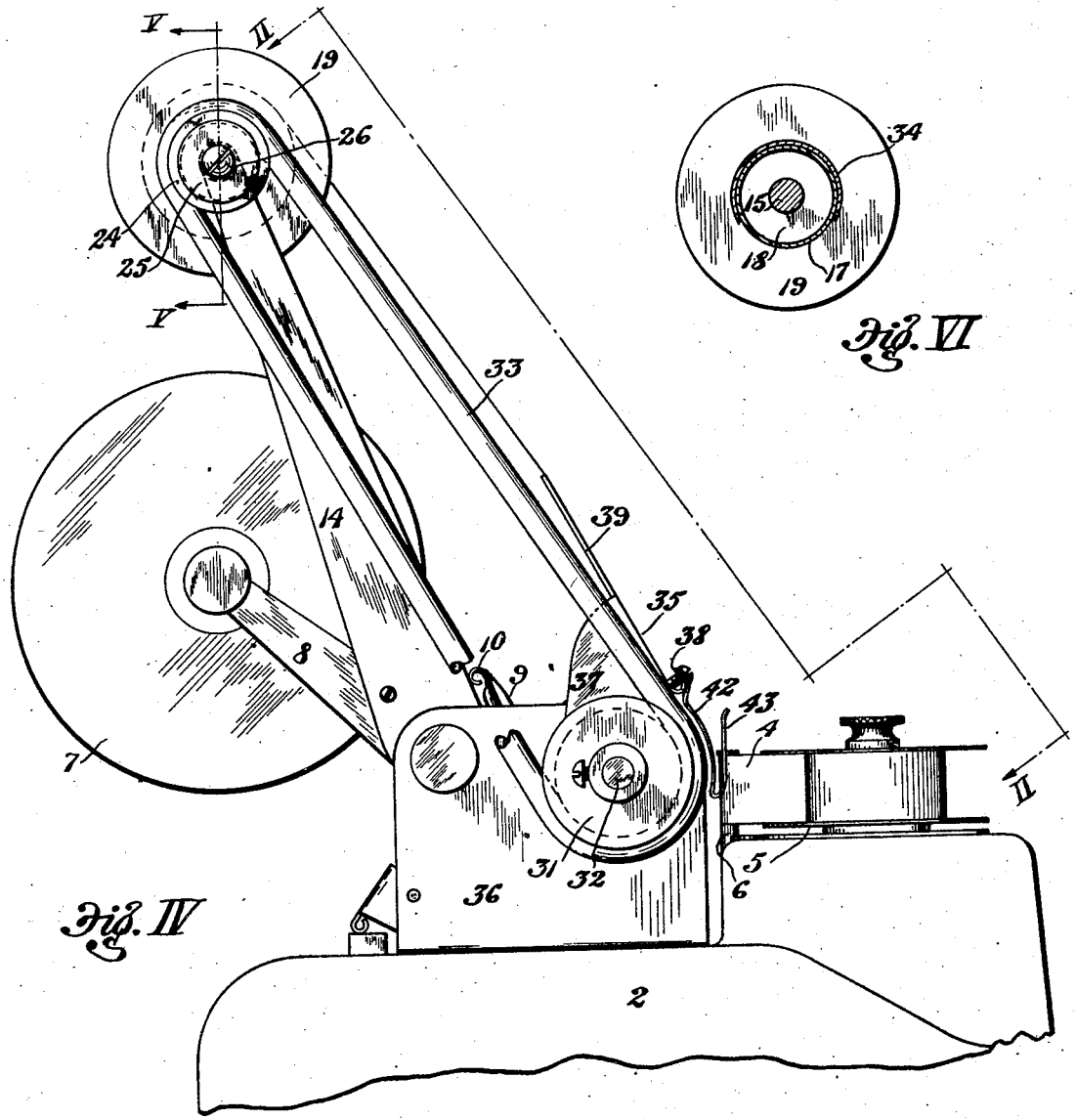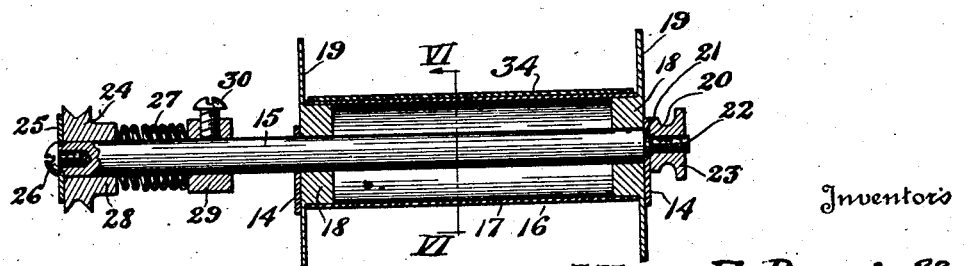

May 24, 1927.
W. E. DUNNING ET AL
1,629,615
ADDING MACHINE
Filed May 22, 1922     4 Sheets-Sheet 4
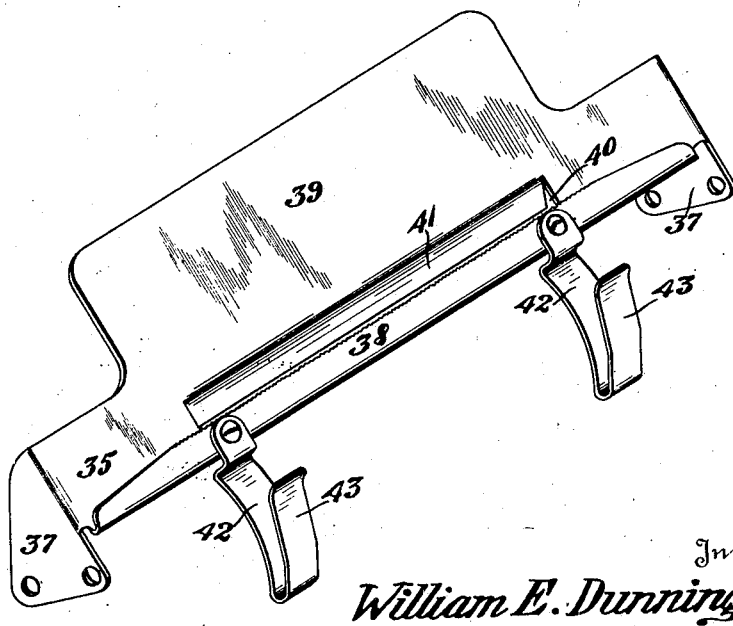

Patented May 24, 1927.

1,629,615

UNITED STATES PATENT OFFICE.

WILLIAM E. DUNNING AND JACOB BACHOFEN, OF ALLIANCE, OHIO, ASSIGNORS TO THE McCASKEY REGISTER COMPANY, OF ALLIANCE, OHIO, A CORPORATION OF OHIO.

ADDING MACHINE.

Application filed May 22, 1922. Serial No. 562,653.

The invention relates to the printing or recording mechanism in an adding machine or the like; and the object of the improvement is to automatically rewind the record strip, to provide a rack to support a sales bill for recording a total thereon, and to provide a platen plate to support the record strip or a sales bill for making pencil corrections or notations thereon.

The record strip in an adding machine is automatically unwound by the operation of the machine from a roll mounted at the rear of the machine, and after passing around the platen roll where the record of transactions is imprinted thereon the strip is projected rearward and accumulates in a bunch at the rear of the machine. The present improvement involves the use of a reel adjacent to the roll, upon which the strip is automatically rewound after passing around the platen roll.

When a plurality of items are entered in a sales bill, they are usually totaled in pencil by the clerk before delivering a carbon copy to the customer and placing the original copy in a filing appliance; and the present improvement further contemplates the use of an adding machine for verifying or auditing the total thus made, and involves the use of a rack to support a sales bill in the machine for imprinting the total thereon, and also involves the use of a platen plate extending upward and rearward from the platen roll, to serve as a rest for the record strip and more particularly for a sales bill supported in the rack.

The invention is illustrated in the accompanying drawings, forming part hereof, in which—

Figure I is a plan view of an adding machine with the improved rewind mechanism, the bill rack, and the platen plate thereon;

Fig. II, an inclined elevation of the rewind mechanism, the bill rack, and the platen plate, as on line II—II, Fig. IV, showing a sales bill supported by the rack, and partly broken away;

Fig. III, a fragmentary section on line III—III, Figs. I and II, showing the platen roll actuating mechanism;

Fig. IV, a side elevation of the rewind mechanism, the bill rack and the platen plate;

Fig. V, a longitudinal section of the rewind reel on line V—V, Figs. I and IV;

Fig. VI, a cross section of the reel on line VI—VI, Fig. V;

Fig. VII, a detached perspective view of the platen plate and sales bill rack; and Fig. VIII, a plan of a sales bill having the pencil and machine totals recorded thereon.

Similar numerals refer to similar parts throughout the drawings.

A platen roll 1 is rotatably mounted on the rear end of the case 2 of an adding machine, in front of which roll the type bars 3 of the machine are operatively mounted. The ink ribbon 4 of the machine is mounted on reels 5 for operating around posts 6 and passing between the key bars and the platen roll. A record strip roll 7 is rotatably mounted on a bracket 8 in rear of the platen roll, whence the record strip 9 passes forward over a guide 10, thence under the platen roll 1, and thence upward around the forward face of the same between the ribbon and the platen roll. A ratchet wheel 11 on one end of the platen roll is actuated by a spring detent 12 to rotate the platen roll a limited distance each time a record has been imprinted on the strip by swinging the operating handle 13 of the adding machine, all in well known manner.

For the purpose of the present improvement, upright arms 14 are secured to the bracket 8, on each side of the roll, and a transverse shaft 15 is journaled in the upper ends of these arms. A reel 16 is secured on the shaft between the arms, and may comprise a tubular body 17 with cylindric heads 18 in each end, each having a disk flange 19 to form a guide or support for the edges of the record strip, when the same is wound on the reel.

The journal 20 one end of the shaft 15 is preferably reduced in diameter so as to form an annular shoulder 21 abutting the inner side of the upright arm; and outside this journal the shaft is again reduced in diameter to form a screw stem 22, upon which a nut 23 is turned against the annular shoulder formed by the end of the journal; the length of the journal being greater than the thickness of the arm 14, so that the shaft may turn freely in the arm bearing.

The shaft 15 is extended outward beyond the other bearing arm 14, and upon the end of the shaft is swivelled a pulley 24 which is retained thereon by a washer 25 secured by a screw 26 on the end of the shaft. The swivelled pulley is impinged by a coiled spring 27 located around the shaft and extending between the hub 28 of the pulley and a collar 29 adjustably secured by a set screw 30 on the shaft. The frictional engagement and pressure of the spring causes the shaft and the reel to be normally rotated by a turning of the pulley, but when the reel is subject to a substantial restraint, the pulley may turn upon the shaft without rotating it.

A driving pulley 31 is secured on the axial shaft 32 of the platen roll, and a belt 33 is mounted around the pulleys, so that the reel 16 is rotated each time the platen roll is turned; and by attaching the end of the record strip to the reel it is evident that the same will be rewound thereon as it is projected from the platen roll. The parts of the mechanism are so arranged that the periphery of the reel will tend to travel slightly faster than the periphery of the roll, so that the record strip will be kept taut between the roll and the reel; the slight differential of speed being accommodated by a slipping of the hub of the swivelled pulley against the end of the compression spring.

A cylindrical segment spring 34 is preferably mounted upon and extends around more than half the circumference of the body 17 of the reel, and the edges of the spring segment are slightly beveled so that an end of a record strip may be readily inserted under the same for being clamped against the body of the reel by a slight turning of the spring around the same; which enables a record strip to be readily attached and detached from the reel.

In the use of the machine the portion of the record strip used each day, or other desired period, is rewound upon the reel as the machine is operated; and at the end of the period, the portion of the strip which has been wound on the reel may be severed from the remainder of the strip, and may then be unwound from the reel for filing, or for such other disposition as may be desired.

A bracket 35 is secured to the frame 36 which carries the platen roll, and as shown, the bracket may be made of sheet metal with flange ears 37 on each end for securing it to the frame, and may have its lower edge strengthened by an upturned flange 38, which may be serrated on its edge to form a blade by which the record strip may be conveniently severed.

The body of the bracket is preferably in the form of a platen plate 39, extending upward and rearward from the face of the platen roll; and a transverse slot 40 is provided across the lower portion of the platen plate, as by cutting and bending rearward a depending tongue 41 from the body of the bracket, through which slot the record strip is passed and operated on its way upward and rearward from the platen roll.

The bracket is also provided with two pendant hooks 42, depending around the forward face of the platen roll on each side of the record strip in rear on the ink ribbon. As shown these hooks may be secured to the upturned flange 38 of the bracket and the free end of each hook 43 is preferably extended upward substantially parallel with the body of the hook for a considerable distance, and then bent slightly forward, so as to form a rack in which the lower end of a sales bill may be entered for supporting it between the ink ribbon and the forward face of the platen roll, as shown in Fig. IV.

The sales bill 44 is shown with entries representing ordinary transactions made by a clerk in a retail store, and includes the amount of an account forwarded, the details of the various items comprising the particular sale, the addition of the same, and the totaling of the account; all of which entries are usually made in pencil by the clerk. Such sales bills are generally made in duplicate, and a carbon copy of the same is handed to the customer while the original copy is placed in a filing appliance.

The improved adding machine may be employed for auditing sales bills of this character, in which event the various items appearing in the bill are successively set up in the adding machine, and if the total shown by the accumulator wheels is the same as the pencil total on the sales bill, the pencil entries are proved to be correct. The lower end of the sales bill may then be entered into the rack formed by the finger hooks of the bracket, and the total printed thereon by the recording mechanism of the machine, as shown in Fig. VII. When the sales bill is provided with a carbon back 45, the total will also be imprinted on the record strip, upon which the items of the bill have been recorded as they are set up in the machine, as shown in Fig. I, wherein the record strip has been moved upward so that the entries will show above the supporting bracket.

In event the total shown by the machine does not agree with the pencil total on the bill, such errors as are found therein may be readily corrected by using the platen plate as a support upon which to write upon the bill; after which the correct total may be printed on the bottom of the bill as above described.

We claim:

1. A printing mechanism for an adding machine or the like, including a platen roll and an ink ribbon, and a bracket having depending hooks extending downward in front of the face of the roll for receiving and supporting a sales bill or the like between the ink ribbon and the forward face of the platen roll.

2. A printing mechanism for an adding machine or the like, including a platen roll around which a record strip operates, and a bracket having a platen plate extending upward and rearward from the face of the platen roll, there being a transverse slot in the platen plate through which the record strip may operate.

3. A printing mechanism for an adding machine or the like, including a platen roll, around which a record strip operates, and a bracket having a platen plate extending upward and rearward from the face of the platen roll, there being a transverse slot in the platen plate through which the record strip may operate, and there being an upturned flange on the lower edge of the platen strip having an edge for severing the record strip.

4. A printing mechanism for an adding machine or the like, including a platen roll around which a record strip operates, and a bracket having a platen plate extending upward and rearward from the face of the platen roll.

WILLIAM E. DUNNING.
JACOB BACHOFEN.